United States Patent
Eda et al.

(10) Patent No.: US 10,552,785 B2
(45) Date of Patent: Feb. 4, 2020

(54) PACKAGE BIDDING DELIVERY LOCATION DETERMINATION

(71) Applicant: INTERNATIONAL BUSINESS MACHINES CORPORATION, Armonk, NY (US)

(72) Inventors: Sasikanth Eda, Pune (IN); Deepak R. Ghuge, Sangamer (IN); Sandeep R. Patil, Pune (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 15/198,037

(22) Filed: Jun. 30, 2016

(65) Prior Publication Data

US 2018/0005168 A1 Jan. 4, 2018

(51) Int. Cl.
*G06Q 10/08* (2012.01)
*G06Q 30/08* (2012.01)
*G06Q 30/02* (2012.01)

(52) U.S. Cl.
CPC ....... *G06Q 10/083* (2013.01); *G06Q 30/0214* (2013.01); *G06Q 30/08* (2013.01)

(58) Field of Classification Search
None
See application file for complete search history.

(56) References Cited

U.S. PATENT DOCUMENTS

| | | | |
|---|---|---|---|
| 7,624,061 B2 | 11/2009 | Greenberg et al. | |
| 8,615,473 B2 * | 12/2013 | Spiegel | G06Q 10/08 705/330 |
| 8,630,897 B1 | 1/2014 | Prada Gomez et al. | |
| 9,488,979 B1 * | 11/2016 | Chambers | G05D 1/0088 |
| 9,507,346 B1 * | 11/2016 | Levinson | G05D 1/0214 |
| 2006/0010037 A1 * | 1/2006 | Angert | G06Q 10/087 705/15 |
| 2012/0278197 A1 * | 11/2012 | Nguyen | G06Q 30/08 705/26.3 |
| 2013/0332292 A1 | 12/2013 | Angert et al. | |
| 2014/0129951 A1 * | 5/2014 | Amin | G06O 50/30 715/738 |

(Continued)

OTHER PUBLICATIONS

Le-Anh, Tuan, and M. B. M. De Koster. "A review of design and control of automated guided vehicle systems." European Journal of Operational Research 171.1 (2006): 1-23 (Year: 2006).*

(Continued)

*Primary Examiner* — Marissa Thein
*Assistant Examiner* — Michelle T Kringen
(74) *Attorney, Agent, or Firm* — Schmeiser, Olsen & Watts; Mark C. Vallone

(57) ABSTRACT

A method and system for determining implementing a bidding based product delivery determination process is provided. The method includes presenting a product for purchase via a bidding process. Packages including the product are pre-loaded on delivery vehicles for delivery within geographical zones including maximum travel distances. Monetary bids for the product are received from users with respect to the delivery vehicles and a user submitting a highest monetary bid is identified. In response, a first delivery vehicle is directed to a location of the user. A profit sharing process with respect to the users and an entity providing the product is enabled.

18 Claims, 7 Drawing Sheets

(56) References Cited

U.S. PATENT DOCUMENTS

| | | | | |
|---|---|---|---|---|
| 2014/0324725 A1* | 10/2014 | Edmonds | ............ | G06Q 10/0835 |
| | | | | 705/333 |
| 2015/0120094 A1* | 4/2015 | Kimchi | ................ | B64C 39/024 |
| | | | | 701/3 |
| 2015/0370251 A1* | 12/2015 | Siegel | ................. | G05D 1/0027 |
| | | | | 701/2 |
| 2017/0293886 A1* | 10/2017 | Bostick | .................. | G01S 19/42 |

\* cited by examiner

PACKAGE BIDDING DELIVERY LOCATION DETERMINATION

FIELD

The present invention relates generally to a method for determining a location for delivery of a product to a user based on a monetary bid amount for the product, and in particular to a method and associated system for determining a delivery location based on a bid amount, travel distance, and travel time for a delivery vehicle.

BACKGROUND

Determining an area for delivery of products typically includes an inaccurate process with little flexibility. Resolving accuracy issues with respect to a monetary variable may include a complicated process that may be time consuming and require a large amount of resources. A delivery method may not take into account all sales factors and therefore is unable to execute appropriate delivery actions. Accordingly, there exists a need in the art to overcome at least some of the deficiencies and limitations described herein above.

SUMMARY

A first aspect of the invention provides a bidding based product delivery determination method comprising: presenting, by a computer processor of server computing device, a product for purchase via a bidding process, wherein packages comprising the product are pre-loaded on a plurality of delivery vehicles for delivery, and wherein the plurality of delivery vehicles are programmed to deliver the product within associated geographical zones comprising associated specified maximum travel distances; presenting, by the computer processor to the plurality of users, a list describing each of the plurality of delivery vehicles with respect to each geographical zone of the associated geographical zones; receiving, by the computer processor from the plurality of users, monetary bids for the product with respect to the plurality of delivery vehicles, wherein each monetary bid of the monetary bids is associated with a specified delivery vehicles of the plurality of delivery vehicles such that each the specified delivery vehicles is programmed to travel within a specified geographical zone of the associated geographical zones with respect to an associated location of an associated user of the plurality of users; identifying, by the computer processor after a specified time period has elapsed since initiating the receiving, a first user of the users submitting a first highest monetary bid of the monetary bids with respect to all other monetary bids of the monetary bids; directing, by the computer processor in response to the identifying, a first delivery vehicle of the plurality of delivery vehicles to a first location of the first user; and enabling, by the computer processor based on the monetary bids and the plurality of users with respect to associated locations, a profit sharing process with respect to the plurality of users and an entity providing the product.

A second aspect of the invention provides a control computing device comprising a computer processor coupled to a computer-readable memory unit, the memory unit comprising instructions that when executed by the computer processor implements a bidding based product delivery determination method comprising: presenting, by the computer processor to a plurality of users, a product for purchase via a bidding process, wherein packages comprising the product are pre-loaded on a plurality of delivery vehicles for delivery, and wherein the plurality of delivery vehicles are programmed to deliver the product within associated geographical zones comprising associated specified maximum travel distances; presenting, by the computer processor to the plurality of users, a list describing each of the plurality of delivery vehicles with respect to each geographical zone of the associated geographical zones; continuously receiving, by the computer processor from the plurality of users, monetary bids for the product with respect to the plurality of delivery vehicles, wherein each monetary bid of the monetary bids is associated with a specified delivery vehicle of the plurality of delivery vehicles such that each the specified delivery vehicle is programmed to travel within a specified geographical zone of the associated geographical zones with respect to an associated location of an associated user of the plurality of users; identifying, by the computer processor after a specified time period has elapsed since initiating the receiving, a first user of the users submitting a first highest monetary bid of the monetary bids with respect to all other monetary bids of the monetary bids; directing, by the computer processor in response to the identifying, a first delivery vehicle of the plurality of delivery vehicles to a first location of the first user, wherein the first location is located within a first geographical zone of the associated geographical zones; and enabling, by the computer processor based on the monetary bids and the plurality of users with respect to associated locations, a profit sharing process with respect to the plurality of users and an entity providing the product.

A third aspect of the invention provides a computer program product, comprising a computer readable hardware storage device storing a computer readable program code, the computer readable program code comprising an algorithm that when executed by a computer processor of a specialized hardware device implements a bidding based product delivery determination method, the method comprising: presenting, by the computer processor to a plurality of users, a product for purchase via a bidding process, wherein packages comprising the product are pre-loaded on a plurality of delivery vehicles for delivery, and wherein the plurality of delivery vehicles are programmed to deliver the product within associated geographical zones comprising associated specified maximum travel distances; presenting, by the computer processor to the plurality of users, a list describing each of the plurality of delivery vehicles with respect to each geographical zone of the associated geographical zones; continuously receiving, by the computer processor from the plurality of users, monetary bids for the product with respect to the plurality of delivery vehicles, wherein each monetary bid of the monetary bids is associated with a specified delivery vehicle of the plurality of delivery vehicles such that each the specified delivery vehicle is programmed to travel within a specified geographical zone of the associated geographical zones with respect to an associated location of an associated user of the plurality of users; identifying, by the computer processor after a specified time period has elapsed since initiating the receiving, a first user of the users submitting a first highest monetary bid of the monetary bids with respect to all other monetary bids of the monetary bids; directing, by the computer processor in response to the identifying, a first delivery vehicle of the plurality of delivery vehicles to a first location of the first user, wherein the first location is located within a first geographical zone of the associated geographical zones; and enabling, by the computer processor based on the monetary bids and the plurality of users with respect to associated locations, a profit sharing process with respect to the plurality of users and an entity providing the product.

The present invention advantageously provides a simple method and associated system capable of determining an area for delivery of products.

DETAILED DESCRIPTION

Figure 1:
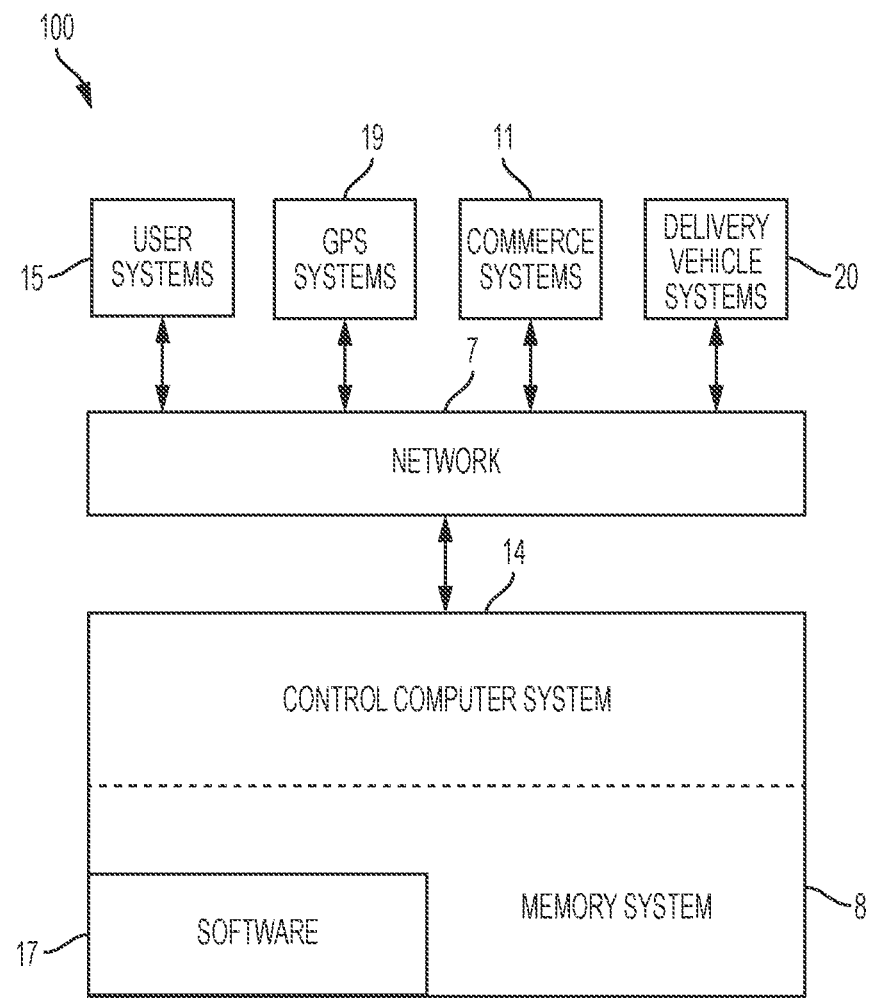
FIG. 1 illustrates a system for determining a location for delivery of a product to a user based on a monetary bid amount for the product and a location of a bidding user, in accordance with embodiments of the present invention.

FIG. 1 illustrates a system 100 for determining a location for delivery of a product to a user based on a monetary bid amount for the product and a location of a bidding user, in accordance with embodiments of the present invention. System 100 enables a process for integrating global positioning satellite (GPS) positioning of delivery vehicles transporting the product associated with a real-time bidding platform utilized by product sales Websites. A delivery vehicle may comprise a vehicle that does not require a human operator to be located within the vehicle such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicle 14 to know it's location and self-determine a route to join with a second vehicle dynamically), a pre-programmed vehicle, etc. Alternatively, a vehicle may comprise any type of vehicle that includes a human operator located within the vehicle (e.g., an aircraft, an automobile, a boat or ship, a train, etc.). A vehicle may include, inter alia, an aerial vehicle, a land based vehicle, a marine (water) based vehicle, etc.

The system 100 may be programmed to dynamically change a delivery address for the product based on real-time bids submitted by users located within a geo-zone of the delivery vehicles. System 100 enables a real time bidding commerce platform continuously selecting an address for delivery of a product via delivery vehicles based on a bid amount, a distance of a bidder from a delivery warehouse, and a time of travel with respect to the delivery vehicles. Additionally, system 100 enables a profit sharing mechanism among the bidders based on a bid amount, a distance, and a time of travel.

The following implementation example illustrates a process (enabled by system 100) for determining a location for delivery of a product:

The process is enabled by an Internet based commerce firm initiating a process for selling limited edition products. The limited edition products are pre-delivered to associated warehouses for delivery. During a product launch date, the Internet based commerce firm enables an associated Website for presentation of a timeframe for initiating a real time bidding process. Prior to initiating the real time bidding process, delivery vehicles are preloaded with the limited edition products. Each delivery vehicle is programmed to travel certain distance within a specified geographical zone. Upon user login to respective accounts (on the Website), he/she is able to view a list of delivery vehicles targeted or intended to cover the user address registered with the Internet based commerce website. Additionally, system 100 facilitates a framework for the user to participate in multiple bidding forums for a single product as a single geographical area may be covered by multiple delivery vehicles. During the bidding process, every user is be given chance to bid and the increasing bid amount is presented transparently to all users. After an initial time gap has elapsed, system 100 identifies a current highest bidder (and associated geographical address) associated with a targeted geographical region for an associated delivery vehicle and the associated geographical address is communicated to the delivery vehicle. Based on the geographical address, the delivery vehicle initiates travel towards the geographical address as the bidding continues. During the continuous bidding process, if any user within the targeted geographical region has raised the bid amount, the delivery vehicle waits for a specified predetermined time interval to elapse and then initiates a change of direction towards a most current highest bidder. The product delivery and profit sharing process is dependent on real time bid quotes and a delivery vehicle travel distance. For example:

1. If a highest bid amount is received from a user located at the end of targeted geographical region, a company profit will not be shared with the user.

2. If a highest bid amount is received from a user located near to the warehouse, a company profit will not be shared with the additional bidders but the user may be given free gift coupons to encourage future bids.

3. If a highest bid amount is received from a user located at the end of targeted geographical region and a second highest bidder (e.g., a bid is 5-10% lower than the highest bid amount) is located at a 75% distance from the warehouse (i.e., closer than the highest bidder), the product is delivered to the second highest bidder and a company profit is shared with the highest bidder.

System 100 of FIG. 1 includes user systems 15, GPS systems 19, commerce systems 11, and delivery vehicle systems 20 connected through a network to control computer system 14. Delivery vehicle systems 20 comprise delivery vehicles and associated embedded controllers for controlling all functions related to the VAVs. An embedded controller is defined herein as a remotely portable dedicated computer comprising a combination of computer hardware and software (fixed in capability or programmable) specifically designed for executing a specialized function. Programmable embedded controllers may comprise specialized programming interfaces. Control computer system 14 generates commands for positioning the delivery vehicles for transporting products associated with a real-time bidding platform (via user systems 15) utilized by product sales Websites via commerce systems 11. Control computer system 14 is enabled to dynamically change a delivery address for products based on the real-time bids submitted by users located within a geo-zone of the delivery vehicles. Control computer system 14 enables a real time bidding commerce platform continuously selecting an address for delivery of a product via delivery vehicles based on a bid amount, a distance of a bidder from a delivery warehouse, and a time of travel with respect to the delivery vehicles. Additionally, control computer system 14 enables a profit sharing mechanism among the bidders based on a bid amount, a distance, and a time of travel. GPS coordinates may be transmitted to a delivery vehicle control system for generating instruction for control of a delivery vehicle for delivery of packages. Control computer system 14 may comprise an embedded controller. Control computer system 14 comprises dedicated monitoring hardware 18, a memory system 8, and software 17. An embedded controller may comprise a remotely portable dedicated computer comprising a combination of computer hardware and software (fixed in capability or programmable) specifically designed for executing a specialized function. A programmable embedded controller may comprise specialized programming interfaces. Additionally, delivery vehicle systems 20 and control computer system may each comprise a specialized hardware device comprising specialized (non-generic) hardware and circuitry (i.e., specialized discrete non-generic analog, digital, and logic based circuitry) for executing a process described with respect to FIG. 2, infra. The specialized discrete non-generic analog, digital, and logic based circuitry may include proprietary specially designed components (e.g., a specialized integrated circuit designed for only implementing an automated process for enabling a process for determining a location for delivery of a product to a user based on a monetary bid amount for the product and a location of a bidding user). The memory system 8 may include a single memory system. Alternatively, the memory system may include a plurality of memory systems. Network 7 may include any type of network including, inter alia, a local area network, (LAN), a wide area network (WAN), the Internet, a wireless network, etc.

Figure 2:
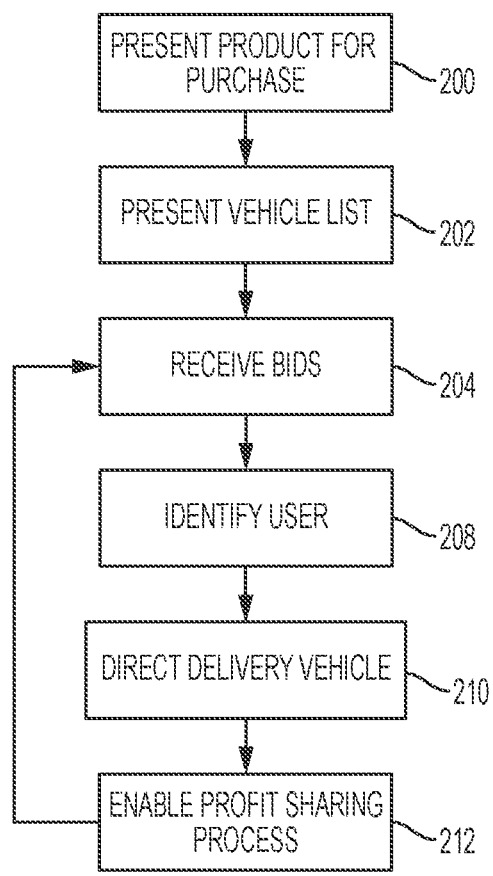
FIG. 2 illustrates a flowchart detailing a process enabled by the system 100 of FIG. 1 for determining a location for delivery of a product to a user based on a monetary bid amount for the product and a location of a bidding user, in accordance with embodiments of the present invention.

FIG. 2 illustrates a flowchart detailing a process enabled by system 100 of FIG. 1 for determining a location for delivery of a product to a user based on a monetary bid amount for the product and a location of a bidding user, in accordance with embodiments of the present invention. Each of the steps in the algorithm of FIG. 2 may be enabled and executed in any order by a computer processor(s) executing computer code. In step 200, a product for purchase is presented to a plurality of users via a bidding process. Packages comprising the product are pre-loaded onto a plurality of delivery vehicles for delivery. The plurality of delivery vehicles are programmed to deliver the product within associated geographical zones associated with specified maximum travel distances. In step 202, a list describing each of the delivery vehicles with respect to each geographical zone is presented to the plurality of users. In step 204, monetary bids for the product (with respect to the plurality of delivery vehicles) are continuously received from the plurality of users. Each monetary bid is associated with a specified delivery vehicle such that each specified delivery vehicle is programmed to travel within a specified geographical zone of the associated geographical zones with respect to an associated location of an associated user of the plurality of users. A user submitting a highest monetary bid with respect to all other monetary bids is identified (after a specified time period has elapsed since initiating the bidding process). In step 210, a first delivery vehicle is directed to a location of the first user. The location is located within a specified geographical zone of the associated geographical zones. The location may be located at a maximum travel distance from the user. Alternatively, the location may located at a specified travel distance from a warehouse comprising the packages and the plurality of delivery vehicles. In step 212, a profit sharing process with respect to the plurality of users and an entity providing the product is enabled and the step 204 is repeated for additional monetary bids from additional users. The profit sharing process may include, inter alia, no monetary profits being shared with the user, directing coupons to the user, etc. Coupons may include discount merchandise coupons or coupons eligible for free merchandise.

Figure 3:
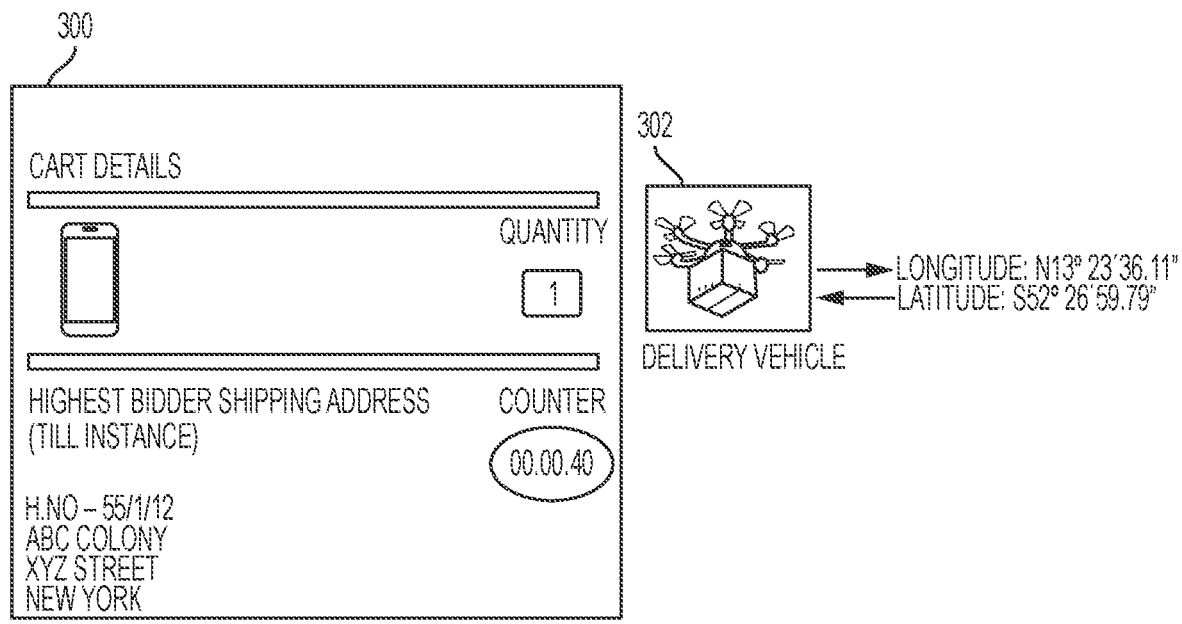
FIG. 3 illustrates a screen shot associated with a bidding based profit sharing process, in accordance with embodiments of the present invention.

FIG. 3 illustrates a screen shot 300 associated with a bidding based profit sharing process, in accordance with embodiments of the present invention. Screen shot 300 illustrates a profit sharing process with respect to bidders and delivery vehicle 302 costs.

Figure 4:
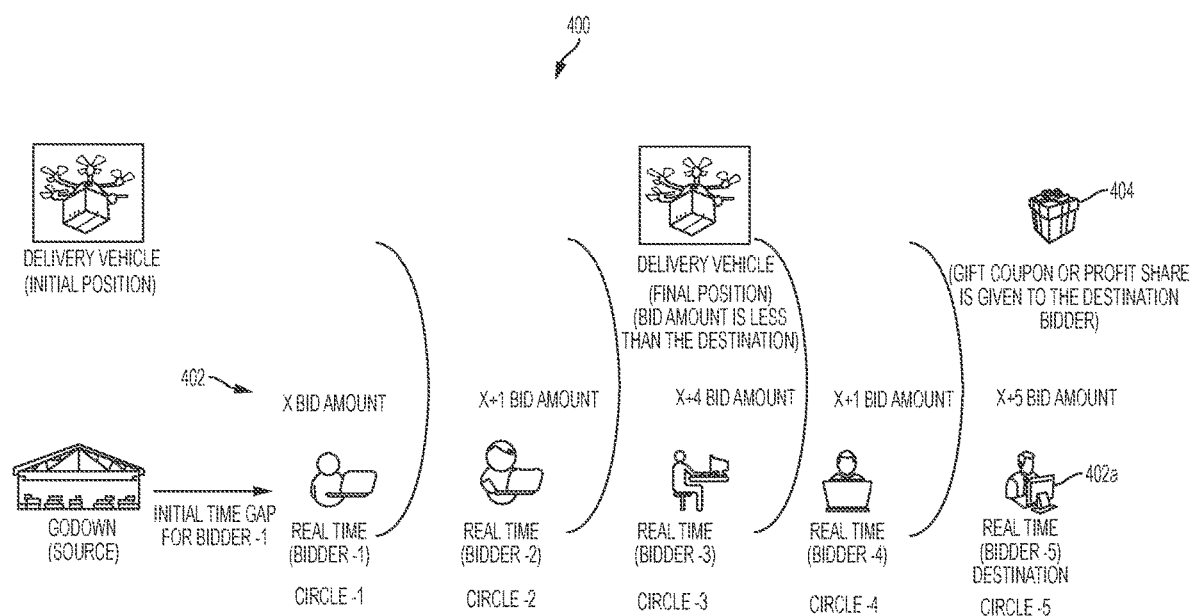
FIG. 4 illustrates a first bidding based profit sharing process, in accordance with embodiments of the present invention.

FIG. 4 illustrates a bidding based profit sharing process 400, in accordance with embodiments of the present invention. Bidding based profit sharing process 400 illustrates multiple bidders 402 with a coupon 404 (or alternative profit sharing means) being awarded to a bidder 402a based on a highest bid amount.

Figure 5:
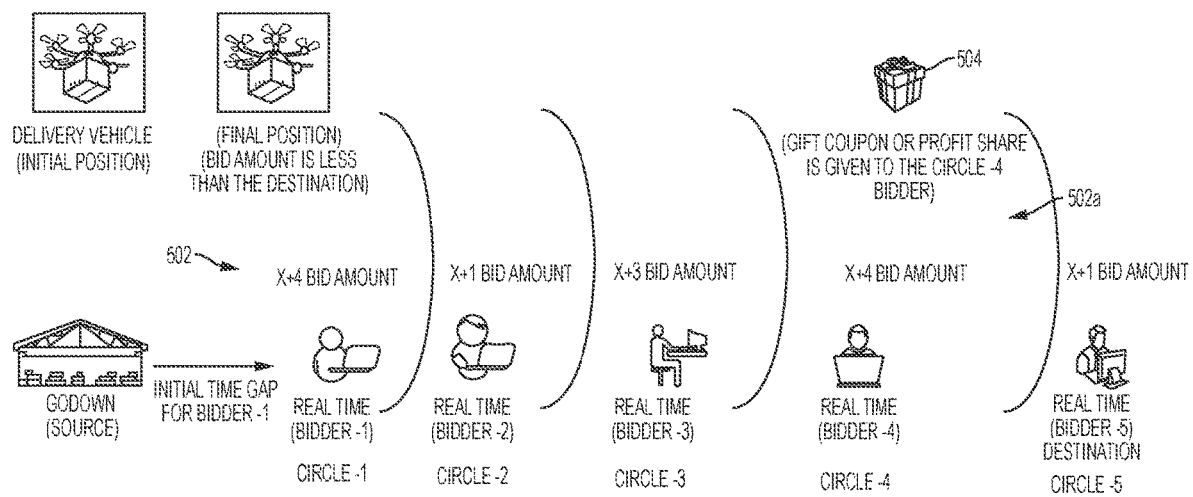
FIG. 5 illustrates a second bidding based profit sharing process, in accordance with embodiments of the present invention.

FIG. 5 illustrates a bidding based profit sharing process 500, in accordance with embodiments of the present invention. Bidding based profit sharing process 500 illustrates multiple bidders 502 with a coupon 504 (or alternative profit sharing means) being awarded to a bidder 502a based on a bid amount and a destination.

Figure 6:
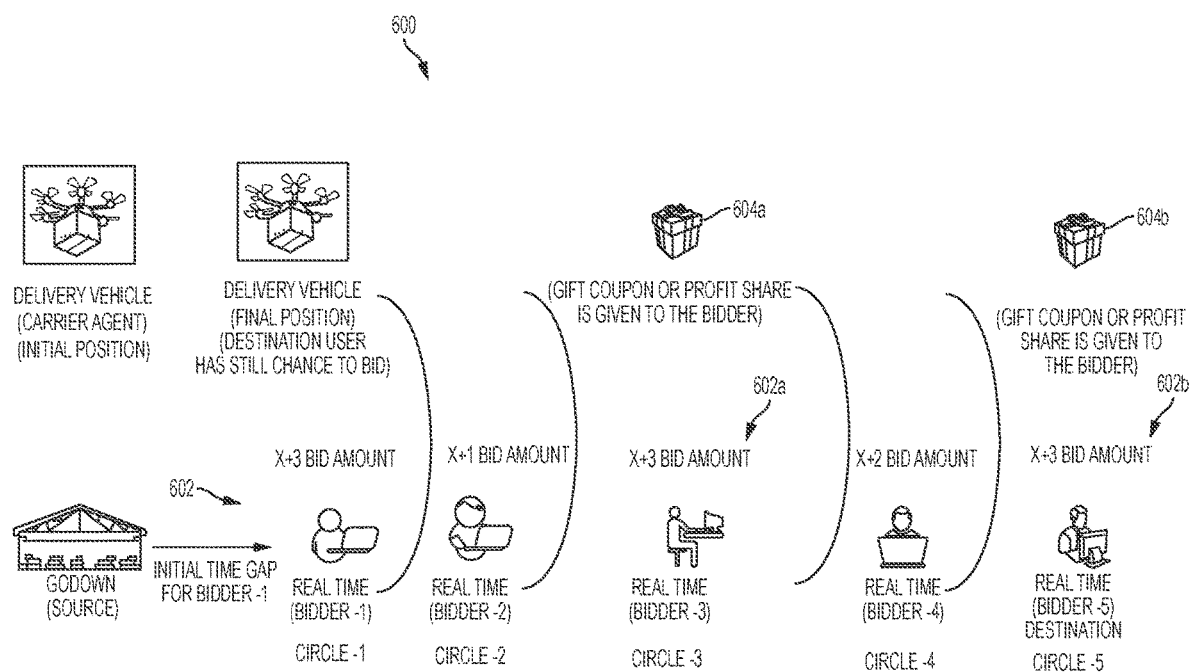
FIG. 6 illustrates a third bidding based profit sharing process, in accordance with embodiments of the present invention.

FIG. 6 illustrates a bidding based profit sharing process 600, in accordance with embodiments of the present invention. Bidding based profit sharing process 500 illustrates multiple bidders 602 with a coupon 604a (or alternative profit sharing means) being awarded to a bidder 602a based on a bid amount and a destination and an additional coupon 604b being awarded to a bidder 602b based on a bid amount.

Figure 7:
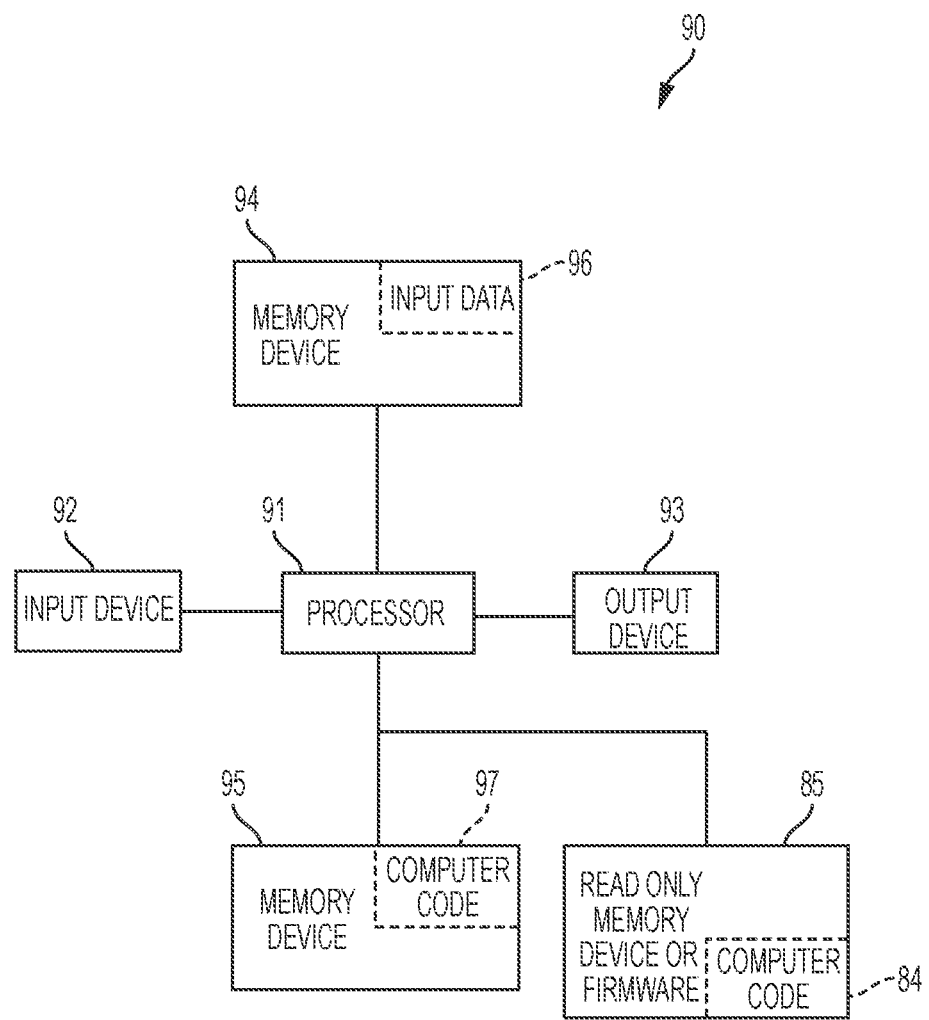
FIG. 7 illustrates a computer system used by the system of FIG. 1 for enabling a process for determining a location for delivery of a product to a user based on a monetary bid amount for the product and a location of a bidding user, in accordance with embodiments of the present invention.

FIG. 7 illustrates a computer system 90 (e.g., a delivery vehicle system 20 and/or control computer system 14) used by or comprised by system 100 of FIG. 1 for determining a location for delivery of a product to a user based on a monetary bid amount for the product and a location of a bidding user, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling a process for determining a location for delivery of a product to a user based on a monetary bid amount for the product and a location of a bidding user. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms of the FIGS. and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to determine a location for delivery of a product to a user based on a monetary bid amount for the product and a location of a bidding user. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for determining a location for delivery of a product to a user based on a monetary bid amount for the product and a location of a bidding user. In another embodiment, the invention provides a business method that performs the process steps of the invention on a subscription, advertising, and/or fee basis. That is, a service supplier, such as a Solution Integrator, could offer to enable a process for determining a location for delivery of a product to a user based on a monetary bid amount for the product and a location of a bidding user. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a specific configuration of specialized hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A bidding based product delivery determination method comprising:
  presenting, by a computer processor of a special purpose computing device to a plurality of users, a product for purchase via a bidding process, wherein packages comprising said product are pre-loaded on a plurality of delivery vehicles for delivery, wherein said plurality of delivery vehicles comprise remotely operated vehicles, wherein said plurality of delivery vehicles are programmed to dynamically modify delivery addresses to deliver said product within associated geographical zones comprising associated specified maximum travel distances, and wherein said special purpose computing device comprises specialized electronic circuitry comprising a programmable logic array utilizing state information of specialized firmware program code configured to execute specialized software for personalizing said specialized electronic circuitry for performing said method;
  presenting, by said computer processor to said plurality of users, a list describing each of said plurality of delivery vehicles with respect to each geographical zone of said associated geographical zones;
  continuously receiving, by said computer processor from said plurality of users, monetary bids for said product with respect to said plurality of delivery vehicles, wherein each monetary bid of said monetary bids is associated with a specified delivery vehicle of said plurality of delivery vehicles such that each said specified delivery vehicle is programmed to travel within a specified geographical zone of said associated geographical zones with respect to an associated location of an associated user of said plurality of users;
  identifying, by said computer processor after a specified time period has elapsed since initiating said receiving, a first user of said users submitting a first highest monetary bid of said monetary bids with respect to all other monetary bids of said monetary bids;
  programming, by said processor, each said specified vehicle to travel a specified distance within said associated geographical zones;
  directing, by said computer processor in response to said identifying and said programming, said first delivery vehicle of said plurality of delivery vehicles to said first location of said first user such that said first delivery vehicle initiates motion and proceeds to said first location for transporting a package of said packages to said first location, wherein said first location is located within a first geographical zone of said associated geographical zones; and
  enabling, by said computer processor based on an amount of said monetary bids and said plurality of users with respect to a travel distance to associated locations, a profit sharing process with respect to said plurality of users and an entity providing said product;
  first identifying, by said computer processor, a second user of said plurality of users submitting a monetary bid that is greater than said first highest monetary bid;
  determining, by said computer processor, that a first specified time period has elapsed since said first identifying said second user;
  automatically re-routing, after said first specified time period has elapsed since said first identifying said second user, by said computer processor in response to said first identifying said second user, said first delivery vehicle to a second location of said second user, wherein said second location is located within said first geographical zone;

directing, by said computer processor in response to said re-routing, said first delivery vehicle to said second location of said second user such that said first delivery vehicle initiates motion and proceeds to said second location for transporting said package to said second location; and revising, by said computer processor based on said monetary bid, said profit sharing process with respect to said plurality of users and an entity providing said product.

2. The method of claim 1, wherein said first location is located at a maximum travel distance of said associated specified maximum travel distances, and wherein said profit sharing process comprises no monetary profits being shared with said first user.

3. The method of claim 1, wherein said first location is located at a specified travel distance from a warehouse comprising said packages and said plurality of delivery vehicles, and wherein said profit sharing process comprises directing coupons to said first user.

4. The method of claim 3, wherein said coupons comprise discount merchandise coupons or coupons eligible for free merchandise.

5. The method of claim 1, wherein said first location is located at a specified travel distance of a warehouse comprising said packages and said plurality of delivery vehicles, wherein a second user of said plurality of users submitted a monetary bid comprising a specified percentage under said first highest monetary bid, wherein said second user is located a first specified travel distance from said warehouse, wherein said first specified travel distance is less than specified travel distance by a specified percentage, and wherein said method further comprises:

re-routing, by said computer processor, said first delivery vehicle to a second location of said second user, wherein said second location is located within said first geographical zone, and wherein said profit sharing process comprises directing monetary funds to said first user.

6. The method of claim 1, wherein said plurality of delivery vehicles comprise pilotless aircraft.

7. The method of claim 1, further comprising:

providing at least one support service for at least one of creating, integrating, hosting, maintaining, and deploying computer-readable code in the computing system, said code being executed by the computer processor to implement: said presenting said product, said presenting said list, said continuously receiving, said identifying, said directing, and said enabling.

8. A special purpose computing device comprising a computer processor coupled to a computer-readable memory unit, said memory unit comprising instructions that when executed by the computer processor implements a bidding based product delivery determination method comprising:

presenting, by said computer processor to a plurality of users, a product for purchase via a bidding process, wherein packages comprising said product are pre-loaded on a plurality of delivery vehicles for delivery, wherein said plurality of delivery vehicles comprise remotely operated vehicles, wherein said plurality of delivery vehicles are programmed to dynamically modify delivery addresses to deliver said product within associated geographical zones comprising associated specified maximum travel distances, and wherein said special purpose computing device comprises specialized electronic circuitry comprising a programmable logic array utilizing state information of specialized firmware program code configured to execute specialized software for personalizing said specialized electronic circuitry for performing said method;

presenting, by said computer processor to said plurality of users, a list describing each of said plurality of delivery vehicles with respect to each geographical zone of said associated geographical zones;

continuously receiving, by said computer processor from said plurality of users, monetary bids for said product with respect to said plurality of delivery vehicles, wherein each monetary bid of said monetary bids is associated with a specified delivery vehicle of said plurality of delivery vehicles such that each said specified delivery vehicle is programmed to travel within a specified geographical zone of said associated geographical zones with respect to an associated location of an associated user of said plurality of users;

identifying, by said computer processor after a specified time period has elapsed since initiating said receiving, a first user of said users submitting a first highest monetary bid of said monetary bids with respect to all other monetary bids of said monetary bids;

programming, by said processor, each said specified vehicle to travel a specified distance within said associated geographical zones;

directing, by said computer processor in response to said identifying and said programming, said first delivery vehicle of said plurality of delivery vehicles to said first location of said first user such that said first delivery vehicle initiates motion and proceeds to said first location for transporting a package of said packages to said first location, wherein said first location is located within a first geographical zone of said associated geographical zones; and enabling, by said computer processor based on an amount of said monetary bids and said plurality of users with respect to a travel distance to associated locations, a profit sharing process with respect to said plurality of users and an entity providing said product;

first identifying, by said computer processor, a second user of said plurality of users submitting a monetary bid that is greater than said first highest monetary bid;

determining, by said computer processor, that a first specified time period has elapsed since said first identifying said second user;

automatically re-routing, after said first specified time period has elapsed since said first identifying said second user, by said computer processor in response to said first identifying said second user, said first delivery vehicle to a second location of said second user, wherein said second location is located within said first geographical zone;

directing, by said computer processor in response to said re-routing, said first delivery vehicle to said second location of said second user such that said first delivery vehicle initiates motion and proceeds to said second location for transporting said package to said second location; and revising, by said computer processor based on said monetary bid, said profit sharing process with respect to said plurality of users and an entity providing said product.

9. The control computing device of claim 8, wherein said first location is located at a maximum travel distance of said associated specified maximum travel distances, and wherein said profit sharing process comprises no monetary profits being shared with said first user.

10. The control computing device of claim 8, wherein said first location is located at a specified travel distance from a warehouse comprising said packages and said plurality of delivery vehicles, and wherein said profit sharing process comprises directing coupons to said first user.

11. The control computing device of claim 10, wherein said coupons comprise discount merchandise coupons or coupons eligible for free merchandise.

12. The control computing device of claim 8, wherein said first location is located at a specified travel distance of a warehouse comprising said packages and said plurality of delivery vehicles, wherein a second user of said plurality of users submitted a monetary bid comprising a specified percentage under said first highest monetary bid, wherein said second user is located a first specified travel distance from said warehouse, wherein said first specified travel distance is less than specified travel distance by a specified percentage, and wherein said method further comprises:
re-routing, by said computer processor, said first delivery vehicle to a second location of said second user, wherein said second location is located within said first geographical zone, and wherein said profit sharing process comprises directing monetary funds to said first user.

13. The control computing device of claim 8, wherein said plurality of delivery vehicles comprise unmanned pilotless aircraft.

14. A computer program product, comprising a computer readable hardware storage device storing a computer readable program code, said computer readable program code comprising an algorithm that when executed by a computer processor of a specialized hardware device implements a bidding based product delivery determination method, said method comprising:
presenting, by said computer processor to a plurality of users, a product for purchase via a bidding process, wherein packages comprising said product are pre-loaded on a plurality of delivery vehicles for delivery, wherein said plurality of delivery vehicles comprise remotely operated vehicles, wherein said plurality of delivery vehicles are programmed to dynamically modify delivery addresses to deliver said product within associated geographical zones comprising associated specified maximum travel distances, and wherein said special purpose computing device comprises specialized electronic circuitry comprising a programmable logic array utilizing state information of specialized firmware program code configured to execute specialized software for personalizing said specialized electronic circuitry for performing said method;
presenting, by said computer processor to said plurality of users, a list describing each of said plurality of delivery vehicles with respect to each geographical zone of said associated geographical zones;
continuously receiving, by said computer processor from said plurality of users, monetary bids for said product with respect to said plurality of delivery vehicles, wherein each monetary bid of said monetary bids is associated with a specified delivery vehicle of said plurality of delivery vehicles such that each said specified delivery vehicle is programmed to travel within a specified geographical zone of said associated geographical zones with respect to an associated location of an associated user of said plurality of users;
identifying, by said computer processor after a specified time period has elapsed since initiating said receiving, a first user of said users submitting a first highest monetary bid of said monetary bids with respect to all other monetary bids of said monetary bids;
programming, by said processor, each said specified vehicle to travel a specified distance within said associated geographical zones;
directing, by said computer processor in response to said identifying and said programming, said first delivery vehicle of said plurality of delivery vehicles to said first location of said first user such that said first delivery vehicle initiates motion and proceeds to said first location for transporting a package of said packages to said first location, wherein said first location is located within a first geographical zone of said associated geographical zones; and
enabling, by said computer processor based on an amount of said monetary bids and said plurality of users with respect to a travel distance to associated locations, a profit sharing process with respect to said plurality of users and an entity providing said product;
first identifying, by said computer processor, a second user of said plurality of users submitting a monetary bid that is greater than said first highest monetary bid;
determining, by said computer processor, that a first specified time period has elapsed since said first identifying said second user;
automatically re-routing, after said first specified time period has elapsed since said first identifying said second user, by said computer processor in response to said first identifying said second user, said first delivery vehicle to a second location of said second user, wherein said second location is located within said first geographical zone;
directing, by said computer processor in response to said re-routing, said first delivery vehicle to said second location of said second user such that said first delivery vehicle initiates motion and proceeds to said second location for transporting said package to said second location; and
revising, by said computer processor based on said monetary bid, said profit sharing process with respect to said plurality of users and an entity providing said product.

15. The computer program product of claim 14, wherein said first location is located at a maximum travel distance of said associated specified maximum travel distances, and wherein said profit sharing process comprises no monetary profits being shared with said first user.

16. The computer program product of claim 14, wherein said first location is located at a specified travel distance from a warehouse comprising said packages and said plurality of delivery vehicles, and wherein said profit sharing process comprises directing coupons to said first user.

17. The computer program product of claim 16, wherein said coupons comprise discount merchandise coupons or coupons eligible for free merchandise.

18. The computer program product of claim 14, wherein said first location is located at a specified travel distance of a warehouse comprising said packages and said plurality of delivery vehicles, wherein a second user of said plurality of users submitted a monetary bid comprising a specified percentage under said first highest monetary bid, wherein said second user is located a first specified travel distance from said warehouse, wherein said first specified travel distance is less than specified travel distance by a specified percentage, and wherein said method further comprises:

re-routing, by said computer processor, said first delivery vehicle to a second location of said second user, wherein said second location is located within said first geographical zone, and wherein said profit sharing process comprises directing monetary funds to said first user.

\* \* \* \* \*